(No Model.)

F. M. MEDLING.
HEAD STALL FOR STOCK.

No. 350,380. Patented Oct. 5, 1886.

WITNESSES:
Fred G. Dieterich
Edw. U. Byrn

INVENTOR:
F. M. Medling
BY Munn & Co.
ATTORNEYS.

UNITED STATES PATENT OFFICE.

FRANCIS MARION MEDLING, OF RUTHERFORD DEPOT, TENNESSEE.

HEADSTALL FOR STOCK.

SPECIFICATION forming part of Letters Patent No. 350,380, dated October 5, 1886.

Application filed March 6, 1886. Serial No. 194,344. (No model.)

*To all whom it may concern:*

Be it known that I, FRANCIS MARION MEDLING, of Rutherford Depot, in the county of Gibson and State of Tennessee, have invented a new and useful Improvement in Headstalls for Stock, of which the following is a specification.

Figure 1:
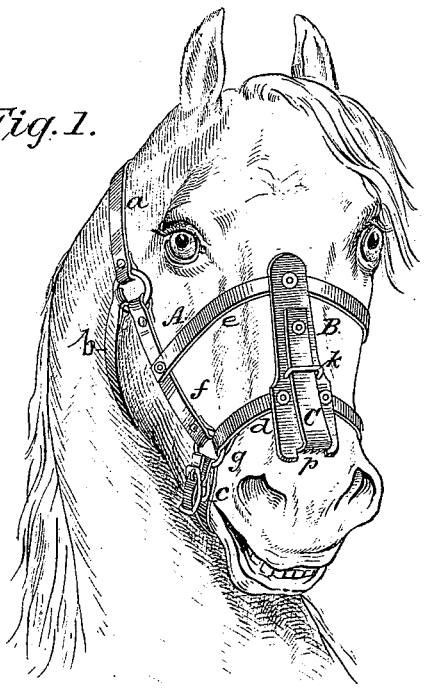
Figure 2:
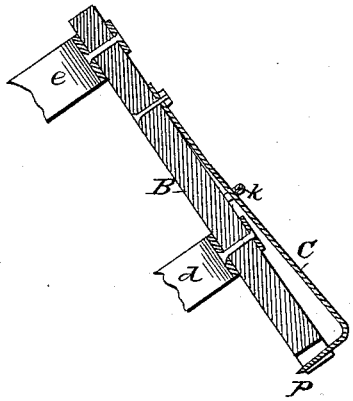

Figure 1 is a perspective view showing the headstall applied to a horse, and Fig. 2 is a sectional detail of bar B and spring C.

The object of my invention is to provide a headstall for stock which may be worn by the animal without interfering with its ability to graze or drink, but which will effectually prevent the animal from jumping fences, and also from sucking.

My invention, so far as its function as an anti-jumping gear is concerned, is founded upon the fact established by observation that nearly if not quite all animals which have a tendency to jump first attempt to push off the top rail with the nose; and my invention consists in a peculiar construction of headstall to be worn by the animal, which headstall has a flat spring mounted upon a rigid bar longitudinally on the face of the animal and extending down to the nose, at which point it is bent inwardly toward the nose and formed into sharp teeth, or provided with points, which spring, when pressed down by the effort of the animal to move the rail or to suck, causes the points to prick the nose, and thus effectually deter the animal from accomplishing its object.

In the drawings, A is the headstall, which is composed of straps *a b c d e f*, connected to two rings, *g h*, on each side. The strap *a* goes around the head back of the ears, *b* goes under the throat, *c* under the chin, *d* over the nose, *e* across the face, and *f* is arranged longitudinally alongside the cheeks and connects the two rings. To the middle of the straps *d* and *e*, and longitudinally on the face of the animal, is riveted or otherwise secured the wooden bar B, which extends well down over the nose. To the upper end of this bar is riveted or otherwise firmly secured the flat spring C, which extends down to the lower end of the wooden bar, and is bent at right angles downwardly and inwardly toward the nose of the animal, and is fashioned into sharp teeth or points *p*. The normal position of this spring is such as to hold the teeth up and away from the wooden bar, which movement is limited by a loop or keeper, *k*. Now, whenever the animal presses the spring down by the effort to lift off the rail or an attempt to suck, the spring is forced down and its points prick the nose of the animal, compelling it to desist.

This invention is not only useful for jumping horses and for weaning young colts and calves, but is also applicable to cows that have the habit of sucking or milking themselves. It will also be seen that the invention does not in any way interfere with the range of vision of the animal, nor prevent him from grazing or drinking.

I am aware of the Patents Nos. 275,732 and 325,434, and I do not claim anything shown therein.

Having thus described my invention, what I claim as new is—

The headstall consisting of the head-strap *a*, throat-strap *b*, and two side straps, *f*, having a common connection on each side with the head and throat straps and the chin-strap *c*, and nose-strap *d*, having also a common connection with side straps, *f*, the face-strap *e*, connected to the two side straps *f f*, and the bar B, with spring C and points *p*, connected to the straps *e* and *d*, substantially as shown and described.

FRANCIS MARION MEDLING.

Witnesses:
 J. T. CURTIS,
 W. A. WREN.